(12) United States Patent
Bocchi et al.

(10) Patent No.: US 12,223,321 B2
(45) Date of Patent: Feb. 11, 2025

(54) METHOD OF OPERATING A MICROPROCESSOR, RELATED PROCESSING SYSTEM AND COMPUTER PROGRAM PRODUCT

(71) Applicant: STMICROELECTRONICS S.r.l., Agrate Brianza (IT)

(72) Inventors: Matteo Bocchi, Brugherio (IT); Adriano Gaibotti, Sesto San Giovanni (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 64 days.

(21) Appl. No.: 18/327,681

(22) Filed: Jun. 1, 2023

(65) Prior Publication Data

US 2023/0409319 A1 Dec. 21, 2023

(30) Foreign Application Priority Data

Jun. 15, 2022 (IT) .................. 102022000012680

(51) Int. Cl.
*G06F 9/30* (2018.01)
(52) U.S. Cl.
CPC ........ *G06F 9/3001* (2013.01); *G06F 9/30029* (2013.01); *G06F 9/3004* (2013.01)
(58) Field of Classification Search
None
See application file for complete search history.

(56) References Cited

U.S. PATENT DOCUMENTS

| | | |
|---|---|---|
| 5,770,894 A | 6/1998 | Agarwal |
| 11,502,836 B2 | 11/2022 | Susella et al. |
| 11,582,039 B2 | 2/2023 | Susella et al. |
| 2011/0022854 A1 | 1/2011 | Macchetti et al. |
| 2019/0205136 A1* | 7/2019 | Hu ............ G06F 9/30076 |
| 2021/0286622 A1 | 9/2021 | Tsirkin |
| 2021/0306134 A1 | 9/2021 | Bocchi |

* cited by examiner

*Primary Examiner* — Scott C Sun
(74) *Attorney, Agent, or Firm* — Seed IP Law Group LLP

(57) ABSTRACT

First combinational, arithmetic, or combinational and arithmetic, operations are applied to data and an expected value, generating result bit sequences. When the value of the data corresponds to the expected value, the result bit sequences are different from each other and correspond to expected values of the result bit sequences. Second operations are applied a first memory address, a second memory address, and the result bit sequences, generating a memory address. When values of the generated result bit sequences correspond to the expected values of the result bit sequences, the generated memory address corresponds to the first memory address. When values of the generated plurality of result bit sequences do not correspond to the expected values of the result bit sequences, the generated memory address corresponds to the second memory address. A software routine starting at the generated memory address is executed.

28 Claims, 2 Drawing Sheets

METHOD OF OPERATING A MICROPROCESSOR, RELATED PROCESSING SYSTEM AND COMPUTER PROGRAM PRODUCT

BACKGROUND

Technical Field

Embodiments of the present disclosure relate to solutions for selectively executing a plurality of software routines.

Description of the Related Art

FIG. 1 shows a block diagram of an exemplary digital processing system 10, such as a micro-controller.

In the example considered, the processing system 10 comprises a microprocessor 102, usually the Central Processing Unit (CPU), programmed via software instructions. Usually, the software executed by the microprocessor 102 is stored in a non-volatile program memory 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data. The microprocessor 102 usually has associated also a volatile memory 104b, such as a Random-Access-Memory (RAM). For example, the memory 104b may be used to store temporary data.

As shown in FIG. 1, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of:
- one or more communication interfaces IF, e.g., for exchanging data via the communication system 20, such as a Universal asynchronous receiver/transmitter (UART), Serial Peripheral Interface Bus (SPI), Inter-Integrated Circuit (I²C), Controller Area Network (CAN) bus, and/or Ethernet interface, and/or a debug interface; and/or
- one or more analog-to-digital converters AD and/or digital-to-analog converters DA; and/or
- one or more dedicated digital components DC, such as hardware timers and/or counters, or a cryptographic co-processor; and/or
- one or more analog components AC, such as comparators, sensors, such as a temperature sensor, etc.; and/or
- one or more mixed signal components MSC, such as a PWM (Pulse-Width Modulation) driver.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

FIG. 2 shows a typical operation of the software executed by the microprocessor 102.

Specifically, after a start step 1000, the microprocessor 102 executes at a step 1002 one or more software instructions, e.g., in the form of a software subroutine, which generate a given result RES. For example, for this purpose, the microprocessor may execute one or more processing operations and/or interact with one or more peripherals 106. For example, the result RES may indicate that a password verification was successful or the result of a cryptographic operation.

At a step 1004, the microprocessor 102 may then execute one or more software instructions in order to compare the result RES with an expected result ERES. In case the result RES corresponds to the expected value ERES (output "Y" of the verification step 1004), the microprocessor 102 executes at a step 1006 a given first software subroutine, e.g., a routine being started when the correct password has been provided or when the encrypted/decrypted correspond to an expected value.

Conversely, in case the result RES does not correspond to the expected value ERES (output "N" of the verification step 1004), the microprocessor 102 executes at a step 1008 a given second software subroutine, e.g., an error handler routine.

Once the routine 1006 or 1008 has been executed, the microprocessor 102 may execute further software instructions or the processing operations may be stopped at a stop step 1010.

For example, in higher-level programming languages, such as C, the conditional statement at the step 1004 is usually expressed via IF/ELSE statements.

However, as shown in FIG. 3, a typical microprocessor uses indeed an instruction pointer/program counter PC indicating a memory location, typically in the non-volatile program memory 104, containing the software instruction to be executed.

Accordingly, in this case, the software instructions implementing the operations 1002 are stored to a given memory area of the memory 104 and the microprocessor executes sequentially the instructions by increasing the program counter PC. However, in order to implement the IF/ELSE condition, the first routine 1006 and the second routine 1008 are stored to respective (different) memory locations. For example, this is shown in FIG. 3, where the routine 1006 starts at a memory address func_ok and the routine 1008 starts at a (different) memory address func_fail.

Accordingly, in this case, the step 1004 is implemented via software instructions configured to instruct the microprocessor 102 to selectively jump to the memory address of the first routine 1006 (func_ok) or the second routine 1008 (func_fail). For example, in this case, the verification step 1004 is usually implemented with at least one conditional jump operation. For example, the software instructions 1004 may comprise the following machine code instructions, which are expressed in assembly code:

CMP RES, ERES

JE func_ok

JMP func_fail

Specifically, the first instruction (CMP) compares the value RES with the expected result ERES and asserts a flag when the value RES and ERES correspond, when RES=ERES. Generally, this instruction may indeed be implemented with a plurality of instructions, e.g., in order to load the values RES and/or ERES to internal registers of the microprocessor 102.

Next the instruction JE (jump if equal) implements a conditional jump, which jumps to the address func_ok, sets the program counter PC to the address func_ok, when a flag of the microprocessor indicates that the previous comparison operation verified that the values are equal, for example when a zero flag ZF is asserted. Finally, the third instruction jumps to the address func_fail, sets the program counter PC to the address func_fail. Specifically, this instruction is only executed when the previous instruction JE not already jumps to the address func_ok.

Typically, modern microprocessors 102 support various types of conditional jump statements, which permit to verify whether one or more flags are set by the previous instructions, such as a carry flag CF and/or the zero flag ZF.

BRIEF SUMMARY

In an embodiment, a method of operating a processor having an associated memory comprises: applying first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences; applying second combinational, arithmetic or combinational and arithmetic operations to a first memory address, a second memory address, and the plurality of result bit sequences, the applying the second combinational, arithmetic or combinational and arithmetic operations generating a memory address, wherein, when the values of the generated plurality of result bit sequences correspond to the expected values of the result bit sequences, the generated memory address corresponds to the first memory address, and when one or more values of the generated plurality of result bit sequences do not correspond to the expected values of the result bit sequences, the generated memory address corresponds to the second memory address; jumping to the generated memory address; and executing a software routine stored in an area of the memory starting at the generated memory address.

In an embodiment, a device comprises a memory and one or more processors coupled to the memory. The one or more processors, in operation: apply first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences; apply second combinational, arithmetic or combinational and arithmetic operations to a first memory address, a second memory address, and the plurality of result bit sequences, the applying the second combinational, arithmetic or combinational and arithmetic operations generating a memory address, wherein, when the values of the generated plurality of result bit sequences correspond to the expected values of the result bit sequences, the generated memory address corresponds to the first memory address, and when one or more values of the generated plurality of result bit sequences do not correspond to the expected values of the result bit sequences, the generated memory address corresponds to the second memory address; jump to the generated memory address; and execute a software routine stored in an area of the memory starting at the generated memory address.

In an embodiment, a system comprises a memory having a plurality of memory areas, a peripheral device, and one or more processors coupled to the memory and to the peripheral device. The one or more processors, in operation: apply first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences; apply second combinational, arithmetic or combinational and arithmetic operations to a first memory address, a second memory address, and the plurality of result bit sequences, the applying the second combinational, arithmetic or combinational and arithmetic operations generating a memory address, wherein, when the values of the generated plurality of result bit sequences correspond to the expected values of the result bit sequences, the generated memory address corresponds to the first memory address, and when one or more values of the generated plurality of result bit sequences do not correspond to the expected values of the result bit sequences, the generated memory address corresponds to the second memory address; jump to the generated memory address; and execute a software routine stored in a memory area of the plurality of memory areas starting at the generated memory address.

In an embodiment, a non-transitory computer-readable medium's contents configure a processing device to perform a method. The method comprises: applying first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences; applying second combinational, arithmetic or combinational and arithmetic operations to a first memory address, a second memory address, and the plurality of result bit sequences, the applying the second combinational, arithmetic or combinational and arithmetic operations generating a memory address, wherein, when the values of the generated plurality of result bit sequences correspond to the expected values of the result bit sequences, the generated memory address corresponds to the first memory address, and when one or more values of the generated plurality of result bit sequences do not correspond to the expected values of the result bit sequences, the generated memory address corresponds to the second memory address; jumping to the generated memory address; and executing a software routine stored in an area of the memory starting at the generated memory address.

BRIEF DESCRIPTION OF THE SEVERAL VIEWS OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 3:
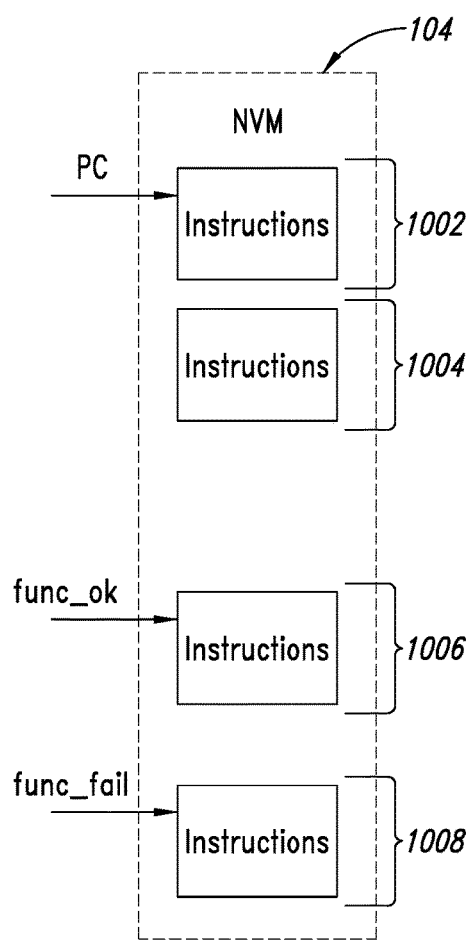
FIG. 3 shows a block diagram of a memory organization of the processing system of FIG. 1.

As mentioned before, various embodiments of the present disclosure provide solutions for starting a first software routine 1006 or a second software routine 1008 based on the result RES obtained by a previous software routine. Specifically, similar to FIG. 3, the software routines 1006 and 1008 may be stored to respective memory areas in the non-volatile memory 104, wherein the software routine 1006 starts at an address func_ok and the software routine 1008 starts at an address func_fail, wherein the address func_fail is different from the address func_ok.

The inventors have observed that IF/THEN statements, and in particular the respective conditional jump statements, e.g., obtained by compiling a higher-level programming language, such as C, may be rather dangerous from a security point of view. Specifically, recently it has been demonstrated that an attacker may modify the comparison result, e.g., assert the flag ZF, whereby the routine 1006 is started, even when the result RES does not correspond to the expected result ERES. Accordingly, in this way, an attacker may force the execution of the routing 1006, even though the result RES does not correspond to the expected result ERES.

In security related applications it has thus been proposed to use several invocations of the routine 1002, and the routine func_ok is only started if and only if all of them return the expected value ERES. Alternatively, nested duplications of several conditional checks 1004 may be used to force the attacker to perform several faults at precise locations.

However, the inventors have observed that the above solutions have various disadvantages. Specifically, even when implementing plural verifications 1004, such verifications are still based on conditional jump operations, whereby the respective jump operation is an explicit branch based on a successful comparison, and an attacker could still find the way to jump to that instruction just flipping branch flags.

Figure 1:
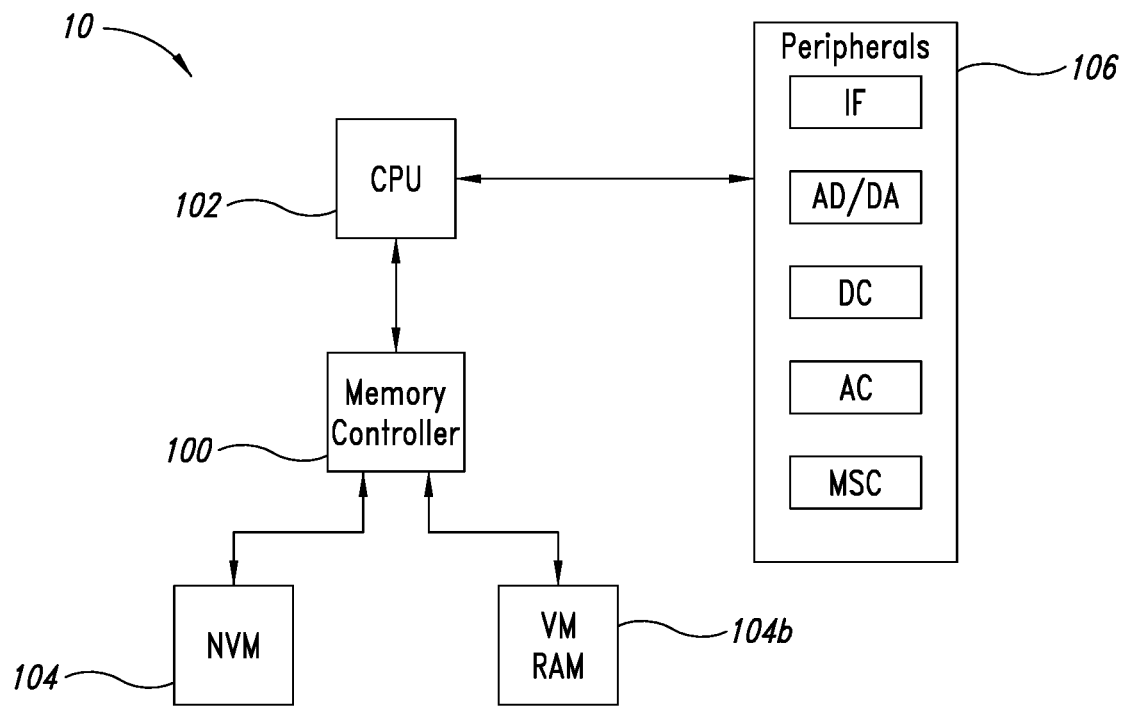
FIG. 1 shows an example of processing system comprising a microprocessor, such as a micro-controller.
Figure 2:
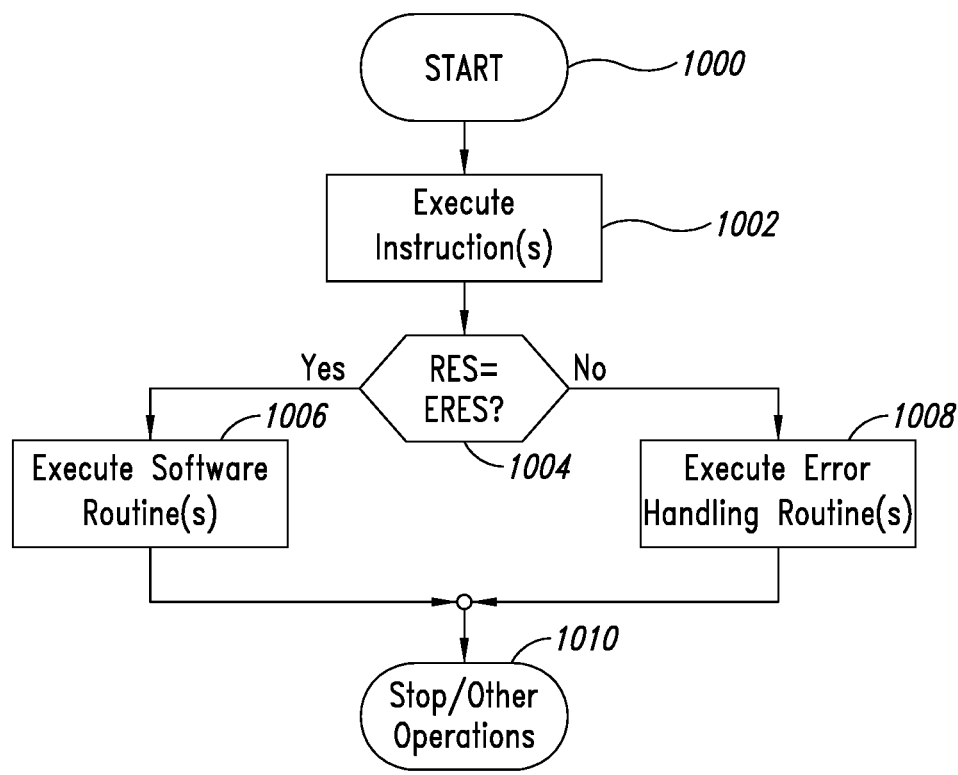
FIG. 2 shows an example of an operation of microprocessor of FIG. 1.
Figure 4:
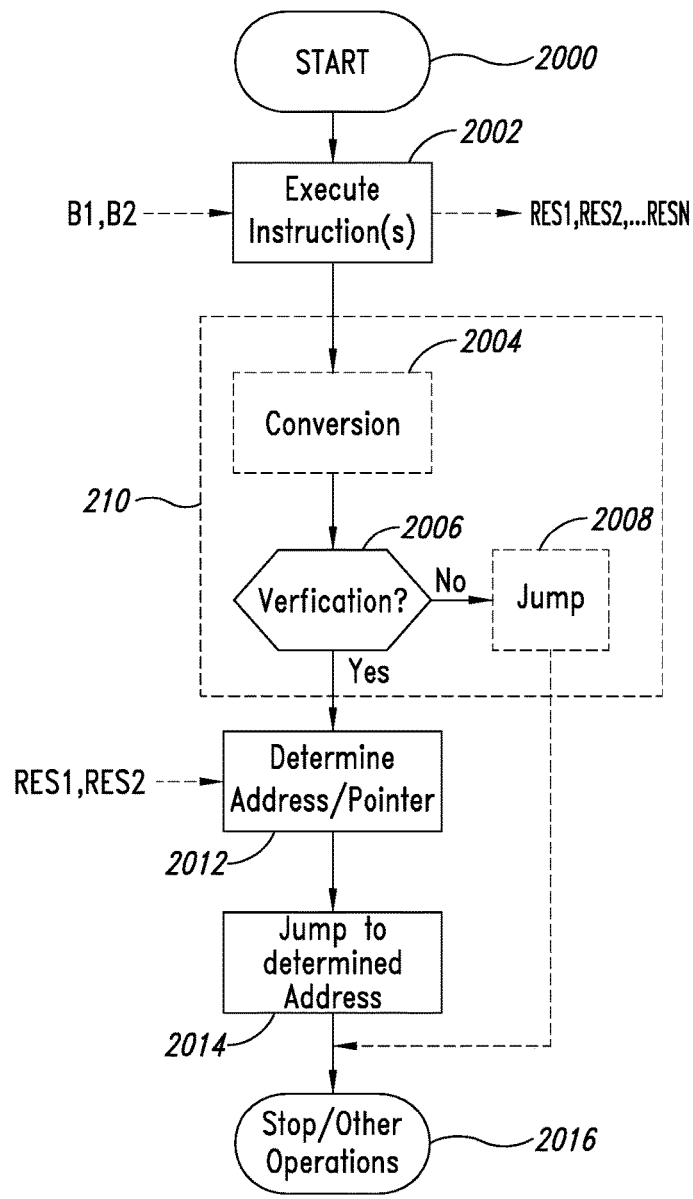
FIG. 4 shows an embodiment of the operation of microprocessor according to the present disclosure.

FIG. 4 shows an embodiment of the operation of a microprocessor 102 according to the present disclosure. Reference can be made to FIG. 1 for a general description of the operation of a microprocessor 102 and a respective processing system 10, such as a micro-controller.

Specifically, after a start step 2000, the microprocessor 102 executes at a step 2002 again one or more software instructions, e.g., in the form of a software subroutine, which generate a given result RES. Specifically, in various embodiments, the instructions 2002 generate at least a first result RES1 and one or more further results, such as results RES2, RES3, . . . RESN.

Specifically, in various embodiments, each of the results RES1, . . . RESN corresponds to a bit-sequence having a given number of bits, such as 8, 16, 32 or 64 bit. For example, in various embodiments, the microprocessor 102 operates with a given word size, such as 8, 16, 32 or 64 bits, and each result RES1, . . . RESN has the word size of the microprocessor 102. Generally, the encoding of the bits of the results RES1, . . . RESN is not relevant for the scope of the present disclosure. For example, the bit sequence of the results RES1, . . . RESN may correspond to a signed or unsigned integer value, or any other encoded bit sequence.

For example, in various embodiments, the step 2002 implements the following function "secure_comparison":

$$RES1=\text{secure\_comparison}(B1,B2,[L],RES2[,\ldots RESN])$$

where B1 and B2 identify the data to be compared, e.g., respective pointers to memory locations having stored a value (B1) to be compared with an expected value (B2), L is an optional parameter indicating the length of the data to be compared, and RES1, RES2 and the optional further results indicate the result of the comparison, e.g., in the form of respective pointers to memory locations used to store the respective comparison result RES1, . . . RESN, e.g., at the end of the routine secure_comparison, the respective memory locations have stored the respective results RES1, . . . RESN.

For example, in various embodiments, the routine 2002 is configured to set each of the results RES1, . . . RESN to a respective first determined value ERES1, . . . ERESN when the data B1 correspond to the data B2, or when using the parameter L, when the indicated number L of bits or bytes of the data B1 corresponds to the respective indicated number of bits or bytes of data B2. Generally, the routine 2002 may assign any other value (being different from the respective first determined value ERES1, . . . ERESN) to the results RES1, . . . RESN when the data B1 do not correspond to the data B2, or when using the parameter L, when the indicated number L of bits or bytes of the data B1 does not correspond to the respective indicated number of bits or bytes of data B2. For example, in various embodiments, the routine 2002 is configured to set in this case each of the results RES1, . . . RESN to a respective second determined value. For example, the value B1 may indicate a password, or a calculated hash code or signature and the value B2 may indicate a respective reference password, or an expected hash code or signature.

Specifically, in various embodiments, when the data B1 and B2 correspond, the routine 2002 assigns to each of the results RES1, . . . RESN a determined first bit sequence ERES1, . . . ERESN, wherein the bit sequences are independent/univocal and may be protected against simple faults. For example, usually the protection against simple faults may be ensured by using bit sequences which do not have all bits set to "1" or "0."

For example, the step 2002 may be implemented with the following instructions:

$$RES1=(B1\char`\^ B2)\char`\^ ERES1$$

$$RES2=(B1\char`\^ B2)\char`\^ ERES2$$

where "^" is and eXclusive-OR operation. Specifically, when the bit sequences B1 and B2 correspond, the respective XOR operation (B1^B2) will have all bits set to 0, whereby the value ERES1 and ERES2 is assigned to the values RES1 and RES2, respectively.

Generally, also any other suitable software instructions may be used, which may use combinational, arithmetic, or combinations of combinational and arithmetic operations in order to assigned the expected values ERES1 and ERES2 to the values RES1 and RES2, when the bit sequences B1 and B2 correspond, such as:

$$RES1=(B1\char`\^ B2)+ERES1$$

$$RES2=(B1\char`\^ B2)+ERES2$$

where "+" indicates an addition.

At a step 2012, the microprocessor 102 then executes a sequence of software instructions configured to determine an address/a pointer func, which corresponds to:
- the address func_ok (of the software routine 1006) when each of the results RES1, . . . RESN corresponds to the respective expected result ERES1, . . . ERESN; and
- the address func_fail (of the software routine 1008) when at least one of the results RES1, . . . RESN does not correspond to the respective expected result ERES1, . . . ERESN.

For example, in various embodiments, the step 2012 implements the following function "dispatcher":

$$func=dispatcher(RES1,RES2,[ \ldots RESN,] func\_ok, func\_fail)$$

wherein the function "dispatcher" is configured to return with the pointer func either the address func_ok or func_fail based on the values RES1, . . . RESN.

Moreover, at the end of the step 2012, a software instruction instructs the microprocessor 102 to jump to the address func, thereby executing at a step 2014 either the routine 1006 (when the pointer func corresponds to the address func_ok) or the routine 1008 (when the pointer func corresponds to the address func_fail). Specifically, this jump is a conventional jump operation and not a conditional jump operation, e.g., the respective software instruction (JMP) sets the program counter to the value func without performing any verification operation.

Once the routine 1006 or 1008 has been executed, at the end of the step 2014, the microprocessor 102 may then execute further software instructions or the processing operations may be stopped at a stop step 2016.

In the following will now be described possible embodiments of the step 2012. Specifically, as mentioned before, the respective software instructions should be configured to return the address func_ok or func_fail by comparing the results RES1, RESN with respective expected result ERES1, . . . ERESN. Specifically, in various embodiments, the respective software routines do not use IF/ELSE statements, in particular respective conditional jump operations, but the routine 2012 is implemented with combinational and/or arithmetic operations.

For example, in a first embodiment, the routine 2012 implements the following operation:

$$func=func\_ok*((RES1==ERES1)\&(RES2==ERES2) \&(RESN==ERESN))+func\_fail* ((RES1!=ERES1)|(RES2!=ERES2) \ldots |(RESN !=ERESN))$$

where "&" indicates a logic AND operation, "|" indicates a logic OR operation, and "*" indicates a multiplication.

Accordingly, in the embodiment considered, when each of the results RES1, . . . RESN corresponds to the respective expected result ERES1, . . . ERESN, the address func_ok is multiplied with 1 and the address func_fail is multiplied with 0, and the sum of both values, the address func_ok, is assigned to the pointer func. Conversely, when at least one of the results RES1, . . . RESN does not correspond to the respective expected result ERES1, . . . ERESN, the address func_ok is multiplied with 0 and the address func_fail is multiplied with 1, and the sum of both values, the address func_fail, is assigned to the pointer func.

In the embodiment considered, the routine 2012 implements thus comparison operations. Generally, the comparison operation "==" configured to verify whether two results correspond may already be implemented with a combinational logic operation. Conversely, the comparison operation "!=" configured to verify whether two results do not correspond usually requires a conditional jump operation. However, the inventors have observed that such a comparison operation may also be implemented with combinational and arithmetic operations. For example, in various embodiments, the comparison operation "!=" between two values A and B is implemented with the following operations:

$$((A\char`\^ B)|(0-(A\char`\^ B)))\!>\!>(wordsize-1))$$

where ">>(wordsize−1)" indicates a right-shift operation of (wordsize−1) bits, where wordsize is the bitsize of the involved operands A and B, such as 32 bit.

Accordingly, the above operations return 1 when the values A and B are different, and 0 when the values A and B correspond.

In general, the step 2012 may also use other combinational and/or arithmetic operations. For example, in a second embodiment, a conditional swap function is used. For example, in various embodiments, the step 2002 uses as expected results ERES1 and ERES2 complementary bit sequences, such as ERES1=0xAAAAAAAA and ERES2=0x55555555, and the routine 2012 implements the following operations:

$$func=\{[(RES1\&func\_ok)|(RES2\&func\_fail)] \&ERES1\}|\{[(RES1\&func\_fail)| (RES2\&func\_ok)]\& ERES2\}$$

Specifically, the above operation ensures that the value func corresponds to the value func_ok when the value RES1 corresponds to the value ERES1 and the value RES2 correspond to the value ERES2. Moreover, the value func corresponds to the value func_fail when the value RES1 corresponds to the value ERES2 and the value RES2 correspond to the value ERES1.

Accordingly, in various embodiments, when using a conditional swap operation 2012 and the values B1 and B2 do not correspond, the routine 2002 is configured to assign to the result RES1 the value ERES2 and to the result RES2 the value ERES1. For example, similar to the previous description of the step 2012, for the purpose may be used the following operations at the step 2002:

$$RES1=ERES1*(B1==B2)+ERES2*(B1 !=B2)$$

$$RES2=ERES2*(B1==B2)+ERES1*(B1 !=B2)$$

Generally, as schematically shown in FIG. 4, when the routine 1002a does not assign automatically values satisfying the above criteria of the conditional swap function, the software instructions may implement an additional conversion step 2010.

For example, in various embodiments, the step 2010 may be implemented (similar to the above equation) with the following operation:

RES1=ERES1'*(RES1==ERES1)+ERES2'*(RES1!=ERES1)

RES2=ERES2'*(RES2==ERES2)+ERES1'*(RES2!=ERES2)

Alternatively, in various embodiments, a first conversion step 2004 may implement the following operations:

RES1=(RES1^ERES1)^ERES1'

RES2=(RES2^ERES2)^ERES2' where ERES1' and ERES2' are the complementary bit sequences, such as ERES1'=0xAAAAAAAA and ERES2'=0x55555555, used by the routine 2012, and ERES1 and ERES2 are the expected results used by the routine 2002. Specifically, by using the XOR operations ("^"), the step 2004 is configured to set the value RES1 to the value ERES1' when the value RES1 corresponds to the expected value ERES1, and the value RES2 to the value ERES2' when the value RES2 corresponds to the expected value ERES2. As shown in the foregoing in the context of the step 2002, the second XOR operation of each equation may also be replaced, e.g., with an addition ("+").

However, the above operations do not correctly map the values RES1 and RES2, when the values do not correspond to the expected results ERES1 and ERES2. Accordingly, in various embodiments, the conversion routine 2010 may comprise one or more verification steps 2006, configured to determine whether the converted values RES1 and RES2 are different from the expected values ERES1' and ERES2'. Moreover, when the converted values RES1 and RES2 are different from the expected values ERES1' and ERES2' (output "N" of the verification step 2006), a software instruction, e.g., implemented via a conditional jump, may jump to the address func_fail. Conversely, when the converted values RES1 and RES2 correspond to the expected values ERES1' and ERES2' (output "Y" of the verification step 2006), the microprocessor 102 may proceed to the step 2012.

Generally, the conditional jump to the failure routine 1008 at this stage does not represent a particular security risk, because by forcing the comparison operation 2006 to provide an incorrect result, the jump at the step 2008 to the failure routine 1008 could be omitted. However, in this case, the routine 2012 would still not assign correctly the address func_ok, because the previously described conditional swap routine 2012 would in this case provide an address pointing neither to the address func_ok nor the address func_fail. For example, the steps 2006 and 2008 may be implemented with the following software instructions:

if(RES1!=ERES1')

func_fail( )

if(RES2!=ERES2')

func_fail( )

Accordingly, in the solutions disclosed herein no explicit branches, conditional jump operations, are used to verify at the step 2012 the successful comparison of the results RES1, ... RESN, which could be exploited by an attacker. Similarly, in various embodiments, also the routine 2002 may use only combinational and/or arithmetic operations in order to determine the results RES1, ... RESN, e.g., as a function of the values B1 and B2.

In various embodiments, the above software routines, such as the functions "secure_comparison" (step 2002) and "dispatcher" (step 2012), may also be provided in the form of a software library, in order to simplify the software development. In fact, in this way it is sufficient that the user provides to the software routines the values B1 and B2 to be compared and the addresses func_ok and func_fail, and the respective software routines implement the combinational and arithmetic operations in order to compare the values B1 and B2 and select, based on the results RES1, ... RESN and the respective expected results ERES1, ... ERESN, one of the addresses func_ok or func_fail.

Those of skill in the art will appreciate that the second embodiment has the advantage that the conditional swap operation may only use combinational logic operations, such as AND and OR operations, and optional XOR operations when implementing the mapping of the results RES1 and RES2. Moreover, the operations are performed always on a plurality of bits.

The above operations may further be improved by storing the routines 1006 and 1008 to memory areas far away from each other. Moreover, the routines 2002 and 2012 may comprise additional instructions in order to introduce random delays in the respective procedure, thereby better hiding the patterns in the instructions and reducing the exploitability of the solution.

Of course, without prejudice to the principle of the disclosure, the details of construction and the embodiments may vary widely with respect to what has been described and illustrated herein purely by way of example, without thereby departing from the scope of the present disclosure, as defined by the ensuing claims.

Embodiments moreover concern a related processing system, as well as a corresponding computer program product, which can be loaded into the memory of at least one microprocessor and comprises portions of software code for implementing the steps of the method when the software code is run on the microprocessor. As used herein, reference to such a computer program product is understood as being equivalent to reference to a computer-readable means containing software instructions for controlling a microprocessor in order to co-ordinate execution of the method.

As mentioned before, various embodiments of the present disclosure relate to solutions, in particular respective software instructions, for operating a microprocessor, such as a microprocessor of a microcontroller. The microprocessor has associated a memory comprising a first software routine stored to a first memory area starting at a first address and a second software routine stored to a second memory area starting at a (different) second address. Specifically, in various embodiments, the microprocessor obtains data and an expected value, and is configured to start the first software routine when the obtained data correspond to the expected value. Conversely, the second software routine may correspond to an error handler routine. For example, the obtained data may correspond to a password, a calculated hash code or a calculated signature, and the expected value may correspond to an expected password, a hash code or signature, respectively.

Specifically, in various embodiments, the microprocessor generates a first result and a second result by combining the obtained data with the expected value via first combinational and/or arithmetic operations. Specifically, the first combinational and/or arithmetic operations are configured to, when the obtained data correspond to the expected value, set the first result to a first determined value and the second result to a second determined value, wherein the second determined value has a bit sequence being different from the bit sequence of the first determined value. In general, the microprocessor may also generate further results.

In various embodiments, the microprocessor obtains then the first address and the second address, and generates an address pointer by combining the first result, the second result, the first address and the second address via second combinational and/or arithmetic operations. Specifically, when the first result corresponds to the first determined value and the second result corresponds to the second determined value, the second combinational and/or arithmetic operations are configured to assign to the address pointer the value of the first address. Conversely, when the first result does not correspond to the first determined value or the second result does not correspond to the second determined value, the second combinational and/or arithmetic operations are configured to assign to the address pointer the value of the second address.

Finally, in various embodiments, the microprocessor jumps to the address pointer, thereby executing the first software routine when the data correspond to the expected value.

Accordingly, in various embodiments, the software instructions used to implement the first combinational and/or arithmetic operations, the second combinational and/or arithmetic operations and the jump operation, do not use conditional jump instructions, avoiding the previously mentions security risks.

Generally, when the obtained data do not correspond to the expected value, the first combinational and/or arithmetic operations may assign any other value to the first and second results.

For example, in various embodiments, when the obtained data do not correspond to the expected value, the first combinational and/or arithmetic operations are configured to set the first result to the second determined value and the second result to the first determined value, the result values are inverted. In this case, the second combinational and/or arithmetic operations may be configured to generate the address pointer via a swap function. Specifically, when the first result corresponds to the first determined value and the second result corresponds to the second determined value, the second combinational and/or arithmetic operations assign to the address pointer the value of the first address. Conversely, when the first result corresponds to the second determined value and the second result corresponds to the first determined value, the second combinational and/or arithmetic operations assign to the address pointer the value of the second address.

As mentioned before, when the obtained data do not correspond to the expected value, the first combinational and/or arithmetic operations may also assign different values. For example, in various embodiments, the first combinational and/or arithmetic operations are configured to generate the first result and/or the second result by combining the data, the expected value and the respective determined value via exclusive OR operations. Alternatively, the first combinational and/or arithmetic operations may combine the data and the expected value via an exclusive OR operation, and add the respective determined value.

In this case, the microprocessor may be configured to use an additional mapping function, which then permits to use again the swap function. Additionally or alternatively, the software instructions may comprise, between the first combinational and/or arithmetic operations and the second combinational and/or arithmetic operations, one or more conditional jump operations configured to, when the first result does not correspond to the first determined value or the second result does not correspond to the second determined value, jump to the second address. As described in greater detail above, this may not represent a particular security risk when the second address points to an error handler routine.

In an embodiment, a method of operating a microprocessor (102) having associated a memory (104), wherein said memory comprises a first software routine (1006) stored to a first memory area starting at a first address (func_ok) and a second software routine (1008) stored to a second memory area starting at a second address (func_fail), includes the steps of obtaining data (B1) and an expected value (B2); generating a first result (RES1) and a second result (RES2) by combining said obtained data (B1) with said expected value (B2) via first combinational and/or arithmetic operations (2002; 2002, 2010), wherein said first combinational and/or arithmetic operations are configured to: when said obtained data (B1) correspond to said expected value (B2), set said first result (RES1) to a first determined value (ERES1), and when said obtained data (B1) correspond to said expected value (B2), set said second result (RES2) to a second determined value (ERES2), wherein said second determined value (ERES2) has a bit sequence being different from the bit sequence of said first determined value (ERES1); obtaining said first address (func_ok) and said second address (func_fail); generating an address pointer (func) by combining said first result (RES1), said second result (RES2), said first address (func_ok) and said second address (func_fail) via second combinational and/or arithmetic operations (2012), wherein said second combinational and/or arithmetic operations are configured to: when said first result (RES1) corresponds to said first determined value (ERES1) and said second result (RES2) corresponds to said second determined value (ERES2), assign to said address pointer (func) the value of said first address (func_ok), and when said first result (RES1) does not correspond to said first determined value (ERES1) or said second result (RES2) does not correspond to said second determined value (ERES2), assign to said address pointer (func) the value of said second address (func_fail); jumping to said address pointer (func), executing (2014) said first software routine (1006) when said data (B1) correspond to said expected value (B2).

Said first combinational and/or arithmetic operations (2002; 2002, 2010) may be configured to when said obtained data (B1) do not correspond to said expected value (B2), set said first result (RES1) to said second determined value (ERES2), and when said obtained data (B1) do not correspond to said expected value (B2), set said second result (RES2) to said first determined value (ERES1).

Said first combinational and/or arithmetic operations (2002; 2002, 2010) may be configured to implement the following operations:

$$RES1=ERES1*(B1==B2)+ERES2*(B1!=B2)$$

$$RES2=ERES2*(B1==B2)+ERES1*(B1!=B2)$$

where RES1 and RES2 correspond to said first result (RES1) and said second result (RES2), respectively, B1 and B2 correspond to said obtained data (B1) and said expected value (B2), respectively, ERES1 and ERES2 correspond to said first determined value (ERES1) and said second determined value (ERES2), respectively, and the operations "==" and "!=" verify whether the respective values correspond or do not correspond.

Said second combinational and/or arithmetic operations (2012) may be configured to generate said address pointer (func) via a swap function configured to when said first result (RES1) corresponds to said first determined value (ERES1) and said second result (RES2) corresponds to said second determined value (ERES2), assign to said address pointer (func) the value of said first address (func_ok), and when said first result (RES1) corresponds to said second determined value (ERES2) and said second result (RES2) corresponds to said first determined value (ERES1), assign to said address pointer (func) the value of said second address (func_fail).

Said second combinational and/or arithmetic operations (2012) may be configured to implement the following operations:

func={[(RES1&func_ok)|(RES2&func_fail)]&
ERES1}|{[(RES1&func_fail)|
(RES2&func_ok)]& ERES2} where func corresponds to said address pointer (func), func_ok and func_fail correspond to said said first address (func_ok) and said second address (func_fail), respectively, RES1 and RES2 correspond to said first result (RES1) and said second result (RES2), respectively, and ERES1 and ERES2 correspond to said first determined value (ERES1) and said second determined value (ERES2), respectively.

Said first combinational and/or arithmetic operations (2002; 2002, 2010) may be configured to generate said first result (RES1) and/or said second result (RES2) by combining (2002) said data (B1), said expected value (B2) and the respective determined value (ERES1, ERES2) via exclusive OR operations, or combining (2002) said data (B1) and said expected value (B2) via an exclusive OR operation, and adding the respective determined value (ERES1, ERES2).

The method may include when (2004) said first result (RES1) does not correspond to said first determined value (ERES1), jumping (2008) to said second address (func_fail); and when (2004) said second result (RES2) does not correspond to said second determined value (ERES2), jumping (2008) to said second address (func_fail).

Said data (B1) may correspond to a password, a calculated hash code or a calculated signature, and said expected value (B2) may correspond to an expected password, a hash code or signature, respectively.

Said second software routine (1008) may correspond to an error handler routine.

A processing system may be summarized as including a microprocessor (102) and a memory (104) includes a first software routine (1006) stored to a first memory area starting at a first address (func_ok) and a second software routine (1008) stored to a second memory area starting at a second address (func_fail), and wherein said memory (104) includes software instructions configured to, when executed by said microprocessor (102), implement the steps of an embodiment of a method disclosed herein.

A computer-program product that can be loaded into the memory (104) of a microprocessor (102), wherein the computer program may be summarized as including software instructions that, when executed by said microprocessor (102), implement the steps of a method as disclosed herein.

In an embodiment, a method of operating a processor having an associated memory comprises: applying first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences; applying second combinational, arithmetic or combinational and arithmetic operations to a first memory address, a second memory address, and the plurality of result bit sequences, the applying the second combinational, arithmetic or combinational and arithmetic operations generating a memory address, wherein, when the values of the generated plurality of result bit sequences correspond to the expected values of the result bit sequences, the generated memory address corresponds to the first memory address, and when one or more values of the generated plurality of result bit sequences do not correspond to the expected values of the result bit sequences, the generated memory address corresponds to the second memory address; jumping to the generated memory address; and executing a software routine stored in an area of the memory starting at the generated memory address.

In an embodiment, the plurality of result bit sequences includes a first result bit sequence and a second result bit sequence; when the value of the obtained data corresponds to the expected value, a value of the first result bit sequence is equal to a first determined value and a value of the second result bit sequence is equal to a second determined value; and when the value of the obtained data does not correspond to the expected value, the value of the first result bit sequence is equal to the second determined value and the value of the second result bit sequence is equal to the first determined value. In an embodiment, the applying first combinational, arithmetic or combinational and arithmetic operations to the obtained data and the expected value includes performing operations according to:

RES1=ERES1*(*B*1==*B*2)+ERES2*(*B*1 !=*B*2)

RES2=ERES2*(*B*1==*B*2)+ERES1*(*B*1 !=*B*2)

where RES1 and RES2 correspond to the first result bit sequence and the second result bit sequence, respectively, B1 and B2 correspond to the obtained data and the expected value, respectively, ERES1 and ERES2 correspond to the first determined value and the second determined value, respectively, and operations "==" and "!=" verify whether respective values correspond or do not correspond. In an embodiment, applying the second combinational, arithmetic or combinational and arithmetic operations includes applying a swap function to generate an address pointer, wherein, when the value of the first result bit sequence is equal to the first determined value and the value of the second result bit sequence is equal to the second determined value, the address pointer has a value corresponding to the first memory address; and when the value of the first result bit sequence is equal to the second determined value and the value of the second result bit sequence is equal to the first determined value, the address pointer has a value corresponding to the second memory address. In an embodiment, the applying second combinational, arithmetic or combinational and arithmetic operations to the first memory address, the second memory address, and the plurality of result bit sequences includes performing operations according to:

func={[(RES1&func_ok)|(RES2&func_fail)]&
ERES1}{[(RES1&func_fail)|
(RES2&func_ok)]& ERES2} where func corresponds to the address pointer, func_ok and func_fail correspond to said the first memory address and the second memory address, respectively, RES1 and RES2 correspond to the first result bit sequence and the second result bit sequence, respectively, and ERES1 and ERES2 correspond to the first determined value and the second determined value, respectively. In an embodiment, the first combinational, arithmetic or combinational and arithmetic operations include operations of: combining the obtained data, the expected value and the first determined value via exclusive OR operations; and combining the obtained data, the expected value and the second determined value via exclusive OR operations. In an embodiment, the first combinational, arithmetic or combinational and arithmetic operations include operations of: combining the obtained data and the expected value via an exclusive OR operation, and adding the first determined value to a result of the combination of the obtained data and the expected value via the exclusive OR operation; and adding the second determined value to the result of the combination of the obtained data and the expected value via the exclusive OR operation. In an embodiment, the method comprises: when the first result bit sequence does not correspond to the first determined value, jumping to the second memory address; and when the second result bit sequence does not correspond to the second determined value, jumping to the second memory address.

In an embodiment, the obtained data corresponds to a password, a calculated hash code or a calculated signature, and the expected value corresponds to an expected password, a hash code or signature, respectively. In an embodiment, when the generated memory address corresponds to the first memory address, the executing the software routine comprises executing a first software routine stored in a first area of the memory starting at the first memory address; and when the generated memory address corresponds to the second memory address, the executing the software routine comprises executing an error handling routine stored in a second area of the memory starting at the second memory address.

In an embodiment, a device comprises a memory and one or more processors coupled to the memory. The one or more processors, in operation: apply first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences; apply second combinational, arithmetic or combinational and arithmetic operations to a first memory address, a second memory address, and the plurality of result bit sequences, the applying the second combinational, arithmetic or combinational and arithmetic operations generating a memory address, wherein, when the values of the generated plurality of result bit sequences correspond to the expected values of the result bit sequences, the generated memory address corresponds to the first memory address, and when one or more values of the generated plurality of result bit sequences do not correspond to the expected values of the result bit sequences, the generated memory address corresponds to the second memory address; jump to the generated memory address; and execute a software routine stored in an area of the memory starting at the generated memory address.

In an embodiment, the plurality of result bit sequences includes a first result bit sequence and a second result bit sequence; when the value of the obtained data corresponds to the expected value, a value of the first result bit sequence is equal to a first determined value and a value of the second result bit sequence is equal to a second determined value; and when the value of the obtained data does not correspond to the expected value, the value of the first result bit sequence is equal to the second determined value and the value of the second result bit sequence is equal to the first determined value. In an embodiment, the one or more processors, in operation, apply the first combinational, arithmetic or combinational and arithmetic operations to the obtained data and the expected value by performing operations according to:

$$RES1=ERES1*(B1==B2)+ERES2*(B1\;!=B2)$$

$$RES2=ERES2*(B1==B2)+ERES1*(B1\;!=B2)$$

where RES1 and RES2 correspond to the first result bit sequence and the second result bit sequence, respectively, B1 and B2 correspond to the obtained data and the expected value, respectively, ERES1 and ERES2 correspond to the first determined value and the second determined value, respectively, and operations "==" and "!=" verify whether respective values correspond or do not correspond. In an embodiment, the one or more processors, in operation, apply the second combinational, arithmetic or combinational and arithmetic operations by applying a swap function to generate an address pointer, wherein, when the value of the first result bit sequence is equal to the first determined value and the value of the second result bit sequence is equal to the second determined value, the address pointer has a value corresponding to the first memory address; and when the value of the first result bit sequence is equal to the second determined value and the value of the second result bit sequence is equal to the first determined value, the address pointer has a value corresponding to the second memory address. In an embodiment, the one or more processors, in operation, apply the first combinational, arithmetic or combinational and arithmetic operations by performing operations of: combining the obtained data, the expected value and the first determined value via exclusive OR operations; and combining the obtained data, the expected value and the second determined value via exclusive OR operations. In an embodiment, the one or more processors, in operation, apply the first combinational, arithmetic or combinational and arithmetic operations by performing operations of: combining the obtained data and the expected value via an exclusive OR operation, and adding the first determined value to a result of the combination of the obtained data and the expected value via the exclusive OR operation; and adding the second determined value to the result of the combination of the obtained data and the expected value via the exclusive OR operation. In an embodiment, the one or more processors, in operation, when the first result bit sequence does not correspond to the first determined value, jump to the second memory address; and when the second result bit sequence does not correspond to the second determined value, jump to the second memory address.

In an embodiment, the obtained data corresponds to a password, a calculated hash code or a calculated signature, and the expected value corresponds to an expected password, a hash code or signature, respectively. In an embodiment, the one or more processors, in operation: when the generated memory address corresponds to the first memory address, execute a first software routine stored in a first area of the memory starting at the first memory address; and when the generated memory address corresponds to the second memory address, execute an error handling routine stored in a second area of the memory starting at the second memory address.

In an embodiment, a system comprises a memory having a plurality of memory areas, a peripheral device, and one or more processors coupled to the memory and to the peripheral device. The one or more processors, in operation: apply first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences; apply second combinational, arithmetic or combinational and arithmetic operations to a first memory address, a second memory address, and the plurality of result bit sequences, the applying the second combinational, arithmetic or combinational and arithmetic operations generating a memory address, wherein, when the values of the generated plurality of result bit sequences correspond to the expected values of the result bit sequences, the generated memory address corresponds to the first memory address, and when one or more values of the generated plurality of result bit sequences do not correspond to the expected values of the result bit sequences, the generated memory address corresponds to the second memory address; jump to the generated memory address; and execute a software routine stored in a memory area of the plurality of memory areas starting at the generated memory address.

In an embodiment, the plurality of result bit sequences includes a first result bit sequence and a second result bit sequence; when the value of the obtained data corresponds to the expected value, a value of the first result bit sequence is equal to a first determined value and a value of the second result bit sequence is equal to a second determined value; and when the value of the obtained data does not correspond to the expected value, the value of the first result bit sequence is equal to the second determined value and the value of the second result bit sequence is equal to the first determined value. In an embodiment, the obtained data corresponds to a password, a calculated hash code or a calculated signature, and the expected value corresponds to an expected password, a hash code or signature, respectively. In an embodiment, the one or more processors, in operation: obtain the obtained data from the peripheral device; and retrieve the expected value from another memory area of the plurality of memory areas of the memory. In an embodiment, the one or more processors, in operation: when the generated memory address corresponds to the first memory address, execute a first software routine stored in a first area of plurality of memory areas of the memory starting at the first memory address; and when the generated memory address corresponds to the second memory address, execute an error handling routine stored in a second area of the plurality of memory areas of the memory starting at the second memory address.

In an embodiment, a non-transitory computer-readable medium's contents configure a processing device to perform a method. The method comprises: applying first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences; applying second combinational, arithmetic or combinational and arithmetic operations to a first memory address, a second memory address, and the plurality of result bit sequences, the applying the second combinational, arithmetic or combinational and arithmetic operations generating a memory address, wherein, when the values of the generated plurality of result bit sequences correspond to the expected values of the result bit sequences, the generated memory address corresponds to the first memory address, and when one or more values of the generated plurality of result bit sequences do not correspond to the expected values of the result bit sequences, the generated memory address corresponds to the second memory address; jumping to the generated memory address; and executing a software routine stored in an area of the memory starting at the generated memory address.

In an embodiment, the plurality of result bit sequences includes a first result bit sequence and a second result bit sequence; when the value of the obtained data corresponds to the expected value, a value of the first result bit sequence is equal to a first determined value and a value of the second result bit sequence is equal to a second determined value; and when the value of the obtained data does not correspond to the expected value, the value of the first result bit sequence is equal to the second determined value and the value of the second result bit sequence is equal to the first determined value. In an embodiment, the method comprises: when the generated memory address corresponds to the first memory address, executing a first software routine stored in a first area of plurality of memory areas of the memory starting at the first memory address; and when the generated memory address corresponds to the second memory address, executing an error handling routine stored in a second area of the plurality of memory areas of the memory starting at the second memory address. In an embodiment, the contents comprise instructions executed by the processing device.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a processor having an associated memory, the method comprising:
applying first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences;
applying second combinational, arithmetic or combinational and arithmetic operations to a first memory address, a second memory address, and the plurality of result bit sequences, the applying the second combinational, arithmetic or combinational and arithmetic operations generating a memory address, wherein,
when the values of the generated plurality of result bit sequences correspond to the expected values of the result bit sequences, the generated memory address corresponds to the first memory address, and
when one or more values of the generated plurality of result bit sequences do not correspond to the expected values of the result bit sequences, the generated memory address corresponds to the second memory address;
jumping to the generated memory address; and
executing a software routine stored in an area of the memory starting at the generated memory address.

2. The method according to claim 1, wherein,
the plurality of result bit sequences includes a first result bit sequence and a second result bit sequence;
when the value of the obtained data corresponds to the expected value, a value of the first result bit sequence is equal to a first determined value and a value of the second result bit sequence is equal to a second determined value; and
when the value of the obtained data does not correspond to the expected value, the value of the first result bit sequence is equal to the second determined value and the value of the second result bit sequence is equal to the first determined value.

3. The method according to claim 2, wherein the applying first combinational, arithmetic or combinational and arithmetic operations to the obtained data and the expected value includes performing operations according to:

RES1=ERES1*(*B*1==*B*2)+ERES2*(*B*1 !=*B*2)

RES2=ERES2*(*B*1==*B*2)+ERES1*(*B*1 !=*B*2)

where RES1 and RES2 correspond to the first result bit sequence and the second result bit sequence, respectively, B1 and B2 correspond to the obtained data and the expected value, respectively, ERES1 and ERES2 correspond to the first determined value and the second determined value, respectively, and operations "==" and "!=" verify whether respective values correspond or do not correspond.

4. The method according to claim 2, wherein applying the second combinational, arithmetic or combinational and arithmetic operations includes applying a swap function to generate an address pointer, wherein,
when the value of the first result bit sequence is equal to the first determined value and the value of the second result bit sequence is equal to the second determined value, the address pointer has a value corresponding to the first memory address; and
when the value of the first result bit sequence is equal to the second determined value and the value of the second result bit sequence is equal to the first determined value, the address pointer has a value corresponding to the second memory address.

5. The method according to claim 4, wherein the applying second combinational, arithmetic or combinational and arithmetic operations to the first memory address, the second memory address, and the plurality of result bit sequences includes performing operations according to:

func={[(RES1&func_ok)|(RES2&func_fail)]& ERES1}{[(RES1&func_fail)| (RES2&func_ok)]& ERES2} where func corresponds to the address pointer, func_ok and func_fail correspond to said the first memory address and the second memory address, respectively, RES1 and RES2 correspond to the first result bit sequence and the second result bit sequence, respectively, and ERES1 and ERES2 correspond to the first determined value and the second determined value, respectively.

6. The method according to claim 2, wherein the first combinational, arithmetic or combinational and arithmetic operations include operations of:
combining the obtained data, the expected value and the first determined value via exclusive OR operations; and
combining the obtained data, the expected value and the second determined value via exclusive OR operations.

7. The method according to claim 2, wherein the first combinational, arithmetic or combinational and arithmetic operations include operations of:
combining the obtained data and the expected value via an exclusive OR operation, and adding the first determined value to a result of the combination of the obtained data and the expected value via the exclusive OR operation; and
adding the second determined value to the result of the combination of the obtained data and the expected value via the exclusive OR operation.

8. The method according to claim 2, comprising:
when the first result bit sequence does not correspond to the first determined value, jumping to the second memory address; and
when the second result bit sequence does not correspond to the second determined value, jumping to the second memory address.

9. The method according to claim 1, wherein the obtained data corresponds to a password, a calculated hash code or a calculated signature, and the expected value corresponds to an expected password, a hash code or signature, respectively.

10. The method according to claim 1, wherein
when the generated memory address corresponds to the first memory address, the executing the software routine comprises executing a first software routine stored in a first area of the memory starting at the first memory address; and when the generated memory address corresponds to the second memory address, the executing the software routine comprises executing an error handling routine stored in a second area of the memory starting at the second memory address.

11. A device, comprising:

a memory; and one or more processors coupled to the memory, wherein the one or more processors, in operation:

apply first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences;

apply second combinational, arithmetic or combinational and arithmetic operations to a first memory address, a second memory address, and the plurality of result bit sequences, the applying the second combinational, arithmetic or combinational and arithmetic operations generating a memory address, wherein, when the values of the generated plurality of result bit sequences correspond to the expected values of the result bit sequences, the generated memory address corresponds to the first memory address, and when one or more values of the generated plurality of result bit sequences do not correspond to the expected values of the result bit sequences, the generated memory address corresponds to the second memory address;

jump to the generated memory address; and execute a software routine stored in an area of the memory starting at the generated memory address.

12. The device according to claim 11, wherein, the plurality of result bit sequences includes a first result bit sequence and a second result bit sequence;

when the value of the obtained data corresponds to the expected value, a value of the first result bit sequence is equal to a first determined value and a value of the second result bit sequence is equal to a second determined value; and when the value of the obtained data does not correspond to the expected value, the value of the first result bit sequence is equal to the second determined value and the value of the second result bit sequence is equal to the first determined value.

13. The device according to claim 12, wherein the one or more processors, in operation, apply the first combinational, arithmetic or combinational and arithmetic operations to the obtained data and the expected value by performing operations according to:

$$RES1=ERES1*(B1==B2)+ERES2*(B1\;!=B2)$$

$$RES2=ERES2*(B1==B2)+ERES1*(B1\;!=B2)$$

where RES1 and RES2 correspond to the first result bit sequence and the second result bit sequence, respectively, B1 and B2 correspond to the obtained data and the expected value, respectively, ERES1 and ERES2 correspond to the first determined value and the second determined value, respectively, and operations "==" and "!=" verify whether respective values correspond or do not correspond.

14. The device according to claim 12, wherein the one or more processors, in operation, apply the second combinational, arithmetic or combinational and arithmetic operations by applying a swap function to generate an address pointer, wherein, when the value of the first result bit sequence is equal to the first determined value and the value of the second result bit sequence is equal to the second determined value, the address pointer has a value corresponding to the first memory address; and when the value of the first result bit sequence is equal to the second determined value and the value of the second result bit sequence is equal to the first determined value, the address pointer has a value corresponding to the second memory address.

15. The device according to claim 12, wherein the one or more processors, in operation, apply the first combinational, arithmetic or combinational and arithmetic operations by performing operations of:

combining the obtained data, the expected value and the first determined value via exclusive OR operations; and combining the obtained data, the expected value and the second determined value via exclusive OR operations.

16. The device according to claim 12, wherein the one or more processors, in operation, apply the first combinational, arithmetic or combinational and arithmetic operations by performing operations of:

combining the obtained data and the expected value via an exclusive OR operation, and adding the first determined value to a result of the combination of the obtained data and the expected value via the exclusive OR operation; and adding the second determined value to the result of the combination of the obtained data and the expected value via the exclusive OR operation.

17. The device according to claim 12, wherein the one or more processors, in operation:

when the first result bit sequence does not correspond to the first determined value, jump to the second memory address; and when the second result bit sequence does not correspond to the second determined value, jump to the second memory address.

18. The device according to claim 11, wherein the obtained data corresponds to a password, a calculated hash code or a calculated signature, and the expected value corresponds to an expected password, a hash code or signature, respectively.

19. The device according to claim 11, wherein the one or more processors, in operation:

when the generated memory address corresponds to the first memory address, execute a first software routine stored in a first area of the memory starting at the first memory address; and when the generated memory address corresponds to the second memory address, execute an error handling routine stored in a second area of the memory starting at the second memory address.

20. A system, comprising:

a memory having a plurality of memory areas;

a peripheral device; and one or more processors coupled to the memory and to the peripheral device, wherein the one or more processors, in operation:
apply first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences;
apply second combinational, arithmetic or combinational and arithmetic operations to a first memory address, a second memory address, and the plurality of result bit sequences, the applying the second combinational, arithmetic or combinational and arithmetic operations generating a memory address, wherein,
when the values of the generated plurality of result bit sequences correspond to the expected values of the result bit sequences, the generated memory address corresponds to the first memory address, and
when one or more values of the generated plurality of result bit sequences do not correspond to the expected values of the result bit sequences, the generated memory address corresponds to the second memory address;
jump to the generated memory address; and
execute a software routine stored in a memory area of the plurality of memory areas starting at the generated memory address.

21. The system according to claim 20, wherein,
the plurality of result bit sequences includes a first result bit sequence and a second result bit sequence;
when the value of the obtained data corresponds to the expected value, a value of the first result bit sequence is equal to a first determined value and a value of the second result bit sequence is equal to a second determined value; and
when the value of the obtained data does not correspond to the expected value, the value of the first result bit sequence is equal to the second determined value and the value of the second result bit sequence is equal to the first determined value.

22. The system according to claim 20, wherein, the obtained data corresponds to a password, a calculated hash code or a calculated signature, and the expected value corresponds to an expected password, a hash code or signature, respectively.

23. The system of claim 22, wherein the one or more processors, in operation:
obtain the obtained data from the peripheral device; and
retrieve the expected value from another memory area of the plurality of memory areas of the memory.

24. The system according to claim 20, wherein the one or more processors, in operation:
when the generated memory address corresponds to the first memory address, execute a first software routine stored in a first area of plurality of memory areas of the memory starting at the first memory address; and when the generated memory address corresponds to the second memory address, execute an error handling routine stored in a second area of the plurality of memory areas of the memory starting at the second memory address.

25. A non-transitory computer-readable medium having contents which configure a processing device to perform a method, the method comprising:
applying first combinational, arithmetic or combinational and arithmetic operations to obtained data and an expected value, the applying the first combinational, arithmetic or combinational and arithmetic operations generating a plurality of result bit sequences, wherein when the value of the obtained data corresponds to the expected value, values of generated plurality of result bit sequences are different from each other and correspond to expected values of the result bit sequences;
applying second combinational, arithmetic or combinational and arithmetic operations to a first memory address, a second memory address, and the plurality of result bit sequences, the applying the second combinational, arithmetic or combinational and arithmetic operations generating a memory address, wherein,
when the values of the generated plurality of result bit sequences correspond to the expected values of the result bit sequences, the generated memory address corresponds to the first memory address, and
when one or more values of the generated plurality of result bit sequences do not correspond to the expected values of the result bit sequences, the generated memory address corresponds to the second memory address;
jumping to the generated memory address; and
executing a software routine stored in an area of the memory starting at the generated memory address.

26. The non-transitory computer-readable medium of claim 25, wherein,
the plurality of result bit sequences includes a first result bit sequence and a second result bit sequence;
when the value of the obtained data corresponds to the expected value, a value of the first result bit sequence is equal to a first determined value and a value of the second result bit sequence is equal to a second determined value; and
when the value of the obtained data does not correspond to the expected value, the value of the first result bit sequence is equal to the second determined value and the value of the second result bit sequence is equal to the first determined value.

27. The non-transitory computer-readable medium of claim 25, wherein the method comprises:
when the generated memory address corresponds to the first memory address, executing a first software routine stored in a first area of plurality of memory areas of the memory starting at the first memory address; and
when the generated memory address corresponds to the second memory address, executing an error handling routine stored in a second area of the plurality of memory areas of the memory starting at the second memory address.

28. The non-transitory computer-readable medium of claim 25, wherein the contents comprise instructions executed by the processing device.

* * * * *